United States Patent
Cheng et al.

(10) Patent No.: US 11,652,763 B2
(45) Date of Patent: May 16, 2023

(54) INFORMATION DISPLAY METHOD AND APPARATUS, AND ELECTRONIC DEVICE

(71) Applicant: Beijing Bytedance Network Technology Co., Ltd., Beijing (CN)

(72) Inventors: Bin Cheng, Shanghai (CN); Bixing Sheng, Hangzhou (CN); Chen Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/866,773

(22) Filed: Jul. 18, 2022

(65) Prior Publication Data

US 2022/0360548 A1 Nov. 10, 2022

Related U.S. Application Data

(63) Continuation of application No. PCT/CN2021/084555, filed on Mar. 31, 2021.

(30) Foreign Application Priority Data

Apr. 30, 2020 (CN) .......................... 202010368422.X

(51) Int. Cl.
*H04L 51/04* (2022.01)
*H04L 51/52* (2022.01)
*H04L 51/10* (2022.01)

(52) U.S. Cl.
CPC .............. *H04L 51/04* (2013.01); *H04L 51/52* (2022.05); *H04L 51/10* (2013.01)

(58) Field of Classification Search
None
See application file for complete search history.

(56) References Cited

U.S. PATENT DOCUMENTS

2014/0282099 A1* 9/2014 Bronder ................ H04L 65/612
715/753
2022/0239882 A1* 7/2022 Yang ....................... G06F 3/167

FOREIGN PATENT DOCUMENTS

| CN | 104965843 A | 10/2015 |
| CN | 106547850 A | 3/2017 |
| CN | 109361959 A | 2/2019 |
| CN | 110099159 A | 8/2019 |
| CN | 110221710 A | 9/2019 |
| CN | 112312225 A | 2/2021 |

(Continued)

*Primary Examiner* — Natisha D Cox

(57) ABSTRACT

Embodiments of the present disclosure disclose an information display method and apparatus, and an electronic device. The method in a specific embodiment comprises: receiving a multimedia information stream, wherein the information stream comprises a multimedia data stream, and interactive information sent by a user according to multimedia information content; determining data types corresponding to the interactive information, the data types comprising an emoji data type and a chat data type; and in response to determining that the interactive information is to be displayed on a display interface displaying the multimedia data stream, displaying the interactive information on the display interface in an interactive information display region corresponding to the data types, the interactive information display region comprising a chat information display region and an emoji information display region.

19 Claims, 6 Drawing Sheets

Receive an information stream of a multimedia, where the information stream comprises a multimedia data stream and interaction information sent by a user according to content of the multimedia — 101

Determine a data type corresponding to the interaction information, where the data type comprises an emoji data type and a chat data type — 102

Display, in response to a determination that the interaction information is displayed on a display interface for displaying the multimedia data stream, the interaction information in an interaction information display region corresponding to the data type on the display interface, where the interaction information display region comprises a chat information display region and an emoji information display region — 103

(56) References Cited

FOREIGN PATENT DOCUMENTS

KR        20190053451 A     5/2019
WO    WO-2018113659 A1 *   6/2018

* cited by examiner

INFORMATION DISPLAY METHOD AND APPARATUS, AND ELECTRONIC DEVICE

CROSS REFERENCE OF RELATED APPLICATION

The present application is continuation application of PCT international patent application PCT/CN2021/084555, filed on Mar. 31, 2021 which claims the priority to Chinese Patent Application No. 202010368422.X, titled "INFORMATION DISPLAY METHOD, APPARATUS AND ELECTRONIC DEVICE", filed on Apr. 30, 2020 with the State Intellectual Property Office of the PRC, both of which are incorporated herein by reference in their entireties.

FIELD

The present disclosure relates to the technical field of internet, and in particular to an information display method, an information display apparatus and an electronic device.

BACKGROUND

Information such as images, voice and application data (electronic whiteboard and graph) may be transmitted in a real time mode between two parties or multiple parties by a network multimedia conference. The network multimedia conference adapts to remote conference and network discussion and so on. Persons located at two or more locations may interaction with each other through the network multimedia conference.

According to the network multimedia conference, information communication is performed mainly by voice and video. That is, when participating in the multimedia conference, the user may listen to audio information of the multimedia conference and/or browse video information of the multimedia conference via a terminal device.

SUMMARY

This section is provided to introduce the concept briefly, and the concept is described in detail in specific embodiments hereinafter. This section is neither intended to identity key features or necessary features of the claimed technical solutions, nor intended to limit scope of the claimed technical solutions.

An information display method, an information display apparatus and an electronic device are provided according to embodiments of the present disclosure.

In a first aspect, an information display method is provided according to embodiments of the present disclosure. The method comprises: receiving an information stream of a multimedia, where the information stream includes a multimedia data stream and interaction information sent by a user according to content of the multimedia; determining a data type corresponding to the interaction information, where the data type includes an emoji data type and a chat data type; and displaying, in response to a determination that the interaction information is to be displayed currently on a display interface, the interaction information in an interaction information display region corresponding to the data type on the display interface, where the interaction information display region includes a chat information display region and an emoji information display region.

In a second aspect, an information display apparatus is provided according to embodiments of the present disclosure. The apparatus comprises a receiving unit, a first determining unit, a second determining unit and a display unit. The receiving unit is configured to receive an information stream of a multimedia. The information stream includes a multimedia data stream and interaction information sent by a user according to content of the multimedia. The first determining unit is configured to determine a data type corresponding to chat data. The data type includes an emoji data type and a chat data type. The second determining unit is configured to determine a data type corresponding to the interaction information. The data type includes an emoji data type and a chat data type. The display unit is configured to display, in response to a determination that the interaction information is to be displayed currently on a display interface, the interaction information in an interaction information display region corresponding to the data type on the display interface. The interaction information display region includes a chat information display region and an emoji information display region.

In a third aspect, an electronic device is provided according to embodiments of the present disclosure. The electronic device comprises: one or more processors; and a storage apparatus storing one or more programs. The one or more programs, when being executed by the one or more processors, cause the one or more processors to implement the method according to the first aspect.

In a fourth aspect, a computer readable medium storing computer program is provided according to embodiments of the present disclosure. The programs are executed by a processor to implement the method according to the first aspect.

According to the information display method, the information display apparatus and the electronic device described in the embodiments of the present disclosure, the information stream of the multimedia is received. The information stream includes the multimedia data stream and interaction information sent by the user according to content of the multimedia. The data type corresponding to the interaction information is determined. The data type includes an emoji data type and a chat data type. In response to a determination that the interaction information is to be displayed currently on the display interface, the interaction information is displayed in an interaction information display region corresponding to the data type on the display interface. The interaction information display region includes a chat information display region and an emoji information display region. According to the above solution, the emoji data and the chat data are displayed in different regions on the display interface for displaying the multimedia data stream. In the prior art, the emoji information is displayed by inserting the emoji data among multiple pieces of chat information in the same information display region, according to an order for receiving the information. Therefore, with the method for displaying interaction information according to the present disclosure, the user can obtain more interaction information with a same type at a same time instant, thereby reducing time for browsing the chat data by the user and thus improving user experience.

BRIEF DESCRIPTION OF THE DRAWINGS

With reference to the drawings and specific embodiments below, the above and other features, advantages and aspects of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the embodiments of the present disclosure may be performed in different orders and/or performed in parallel. In addition, the method embodiments may include additional steps and/or steps omitted. The scope of the present disclosure is not limited thereto.

The term "including" and variations thereof adopted herein is inclusive, that is "including but not limited to". The term "based on" means "at least partially based on". The term "one embodiment" means "at least one embodiment", and the term "another embodiment" means "at least another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

Figure 1:
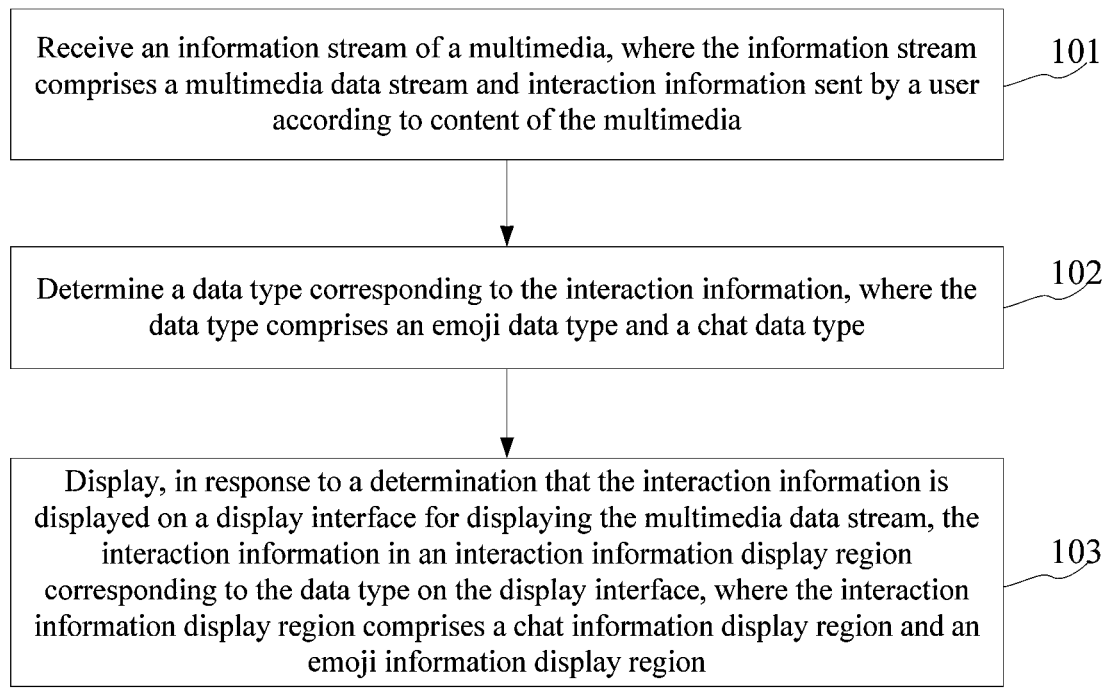
FIG. 1 is a flowchart of an information display method according to an embodiment of the present disclosure.

Reference is made to FIG. 1 which shows a flowchart of an information display method according to an embodiment of the present disclosure. The information display method comprises the following steps 101 to 103.

In step 101, an information stream of a multimedia is received. The information stream includes a multimedia data stream and interaction information sent by a user according to content of the multimedia.

The multimedia data stream may include: a multimedia data stream of a multimedia conference, a live broadcast data stream of a multimedia conference, and a multimedia data stream of a recorded multimedia.

The interaction information herein may be interaction information transmitted by a user who browses the multimedia data stream according to content of the multimedia to another user who browses the multimedia information. The interaction information may include but not limited to emoji data interaction information and chat data interaction information. The chat data interaction information may include chat and/or picture.

The user who browses the multimedia data stream may input the interaction information by utilizing a terminal device when browsing the multimedia content. The terminal device may transmit the interaction information to a server, and the server forwards the interaction information.

In some application scenarios, the multimedia data steam may be a multimedia data stream of a multimedia conference. A user may participate in a multimedia conference via a terminal device. The terminal device herein includes but not limited to a smart mobile phone, a tablet computer, a laptop portable computer and a desktop computer.

The multimedia conference herein may be an audio conference or a video conference.

Generally, in the multimedia conference, the terminal device of the user participating in the conference receives an information stream of the multimedia conference sent by a multimedia conference server.

The information stream of the multimedia conference may include a multimedia data stream and interaction information sent by the user participating in the conference according to content of the multimedia conference.

In the embodiment, the user participating in the multimedia conference may acquire a multimedia data stream of another user participating in the conference via the terminal device, and may input his multimedia data stream and input interaction information on the multimedia conference via the terminal device.

The terminal device may display the content of the multimedia data stream and the interaction information on its display screen. The content of the multimedia data stream may be video frames corresponding to a video data stream.

In step 102, a data type corresponding to the interaction information is determined. The data type includes an emoji data type and a chat data type.

In step 101, when the information stream of the multimedia conference is received, the information stream may be analyzed. Interaction information is determined from the analyzed information stream. Then, the data type corresponding to the interaction information is determined.

It should be understood that the type of the interaction information may be determined in a real time manner. That is, a data type corresponding to the interaction information received at each time instant is determined.

In step 103, in response to a determination that the interaction information is to be displayed on a display interface for displaying the multimedia data stream, the interaction information is displayed in an interaction information display region corresponding to the data type on the display interface. The interaction information display region includes a chat information display region and an emoji information display region.

In the embodiment, whether to display the interaction information on the display interface of the multimedia data stream may be set. A display parameter of the interaction information may be set on the terminal device by the user participating in the conference. The display parameter includes displaying and hiding, for example.

It may be determined whether to display the interaction information on the display interface for displaying the multimedia data according to a current display parameter of the interaction information. If the current display parameter of the interaction information is displaying, it is determined to display the chat interaction information on the display interface. If the current display parameter of the interaction information is hiding, it is determined to hide the interaction information on the display interface.

The interaction information may be displayed on the display interface. Schematically, a graph layer displaying the interaction information may differ from a graph layer where the display interface for displaying the multimedia data stream is located. In this case, information displayed by the multimedia data stream may be adjusted without affecting display of the interaction information.

The graph layer where the interaction information display region is located may be arranged to be above the graph layer where the display interface for displaying the multimedia data stream is located.

A size of the interaction information display region may be less than the display interface for displaying the multimedia data stream.

A background graph layer where the interaction information display region is located may be set to have a great transparency. In this case, in displaying the interaction information, the information of the multimedia data stream displayed on the display interface may be browsed through the interaction information display region.

In the embodiment, the interaction information display region may include a chat information display region and an emoji information display region.

The emoji information and the chat information are displayed at different positions in the interaction information display region.

In some optional embodiments, the emoji information display region may be independent from the chat information display region. In an example, the chat information display region may be set to be above the emoji information display region.

The chat information display region and the emoji information display region are arranged in the interaction information display region, and the chat information and the emoji information are displayed in different regions. In this way, the chat information display region displays only chat data sent by the user participating in the user, and the emoji information display region displays only the emoji data sent by the user participating in the user.

No emoji information is inserted into the chat data displayed in the chat information display region, so that the user can continuously browse the chat data in the chat information display region.

In a prior art, multiple pieces of emoji information is inserted into the multiple pieces of chat information for displaying in a same information display region based on an order for receiving the information. When the user browses the chat data, the user needs to skip some emoji data to browse multiple pieces of chat data. In an aspect, the user needs to continuously flip the chat information to obtain multiple pieces of chat data. In another aspect, continuity of the displayed chat data is interrupted by the emoji data, resulting in that continuity of the chat data information felt by the user is poor.

In the solution according to the present disclosure, the chat data and the emoji data are displayed in different regions. The chat data and the emoji data may be displayed in different limited chat data display regions on the display region of the multimedia data stream. The user can browse the data without interruption from the chat data, and the user can browse the emoji data without interruption from the chat data.

Compared with the emoji data, the user intends to pay more attention to the chat data. The user can browse multiple pieces of chat data in the chat information display region without interruption from the emoji data. According to the above solution, the chat data and the emoji data are displayed in different regions, so that the user can obtain more interaction information with a same type at a same time instant, thereby improving the user experience.

According to the information display method provided in the embodiment, the information stream of the multimedia is received. The information stream includes a multimedia data steam and interaction information sent by the user according to content of the multimedia. The data type corresponding to the interaction information is determined. The data type includes an emoji data type and a chat data type. In response to a determination that the interaction information is to be displayed on the display interface for displaying the multimedia data stream, the interaction information is displayed in the interaction information display region corresponding to the data type on the display interface. The interaction information display region includes a chat information display region and an emoji information display region. In the prior art, the emoji information is displayed by inserting the emoji data among multiple pieces of chat information in the same information display region, according to an order for receiving the information. Therefore, with the method for displaying interaction information according to the present disclosure, the user can obtain more interaction information with a same type at a same time instant, thereby improving user experience.

In some optional implementations of the embodiment, in the emoji information display region, a display duration of the emoji data is less than a first preset duration threshold.

The first preset duration threshold may be 30 seconds, 1 minute and so on. The first preset duration threshold may be set according to specific application scenarios and is not limited herein. When a display duration of any emoji data in the emoji information display region is greater than the first preset duration threshold, the emoji data may be removed from the emoji information display region. The displayed emoji data is not stored in the interaction information record.

In some optional implementations of the embodiment, the information display method further comprises: generating a chat record based on chat data inputted in the chat information display region by the user.

In some optional implementations, the chat record may be generated according to the chat data inputted in the chat information display region by the user, so that the user views historical chat data according to the chat record.

In some optional implementations, the chat record does not include the emoji data. Compared with the conventional solution that the emoji data is recorded in the chat record, according to the solution of the present disclosure, the emoji data is not recorded in the chat record, thereby being convenient for the user to quickly view the historical chat data.

In an aspect, an amount of data to be stored can be reduced. In another aspect, a size of the emoji display region can be reduced accordingly. A ratio of the emoji information display region to the chat information display region may be set to be relatively small, so that more chat data can be displayed in the limited chat data display region.

In some optional implementations of the embodiment, the information display method further comprises: in response to a determination that the chat data is not to be displayed on the display interface currently, displaying first prompt information indicating that new interaction information is received on the display interface.

In the optional implementations, the first prompt information may be preset prompt information indicating that new interaction information is received. The first prompt information may include but not limited to words, numbers and symbols.

The first prompt information is displayed on the display interface, so that the user knows the new interaction information in a timely manner. The interaction information herein may be chat information.

Optionally, the user may click the first prompt information to open the interaction information display region on the display interface. The new interaction information is displayed in the interaction information display region.

The interaction information herein may include chat data and/or emoji data, thereby being convenient for the user to quickly acquire the new interaction information.

In some optional implementations of the embodiment, a preset number of chat data is displayed in the preset chat information display region in an order opposite to an order for receiving the chat data by default.

That is, the chat data received latest is displayed by default, so that the user quickly knows the newly received chat data.

In some optional implementations of the embodiment, the information display method further comprises: in response to an operation instruction for viewing historical chat data performed on the chat information display region by the user being received, displaying corresponding historical chat data in the chat information display region.

In the optional implementations, the chat data may be stored during an operation process of the multimedia conference. The chat data may be stored by a user terminal device or may be stored by a server of the multimedia conference. It is assumed that the multimedia data stream is a data stream of the multimedia conference. During an operation process of the multimedia conference, when the user participating in the conference performs a scrolling operation on the chat information display region of the terminal device, that is, performing an operation for viewing historical chat data, the historical chat data corresponding to the scrolling operation is displayed in the chat information display region, thereby being convenient for the user to browse the historical chat data.

The information display method further comprises: if new chat data is received while the user is viewing the historical chat data, displaying second prompt information indicating that the new chat data is received in the chat information display region.

In some optional implementations, if new chat data is received when the user browses the historical chat information, second prompt information indicating that the new chat data is received is displayed in the chat information display region. The second prompt information may be any prompt information indicating the new chat data is currently received. The second prompt information may include but not limited to words, numbers and symbols.

The information display method further comprises: in response to a trigger operation performed on the second prompt information by the user, displaying the new chat data in the chat information display region.

In some optional implementations, if new chat data is received when the user browses the historical chat data, second prompt information is displayed in the chat information display region, so as to prompt the user participating in the conference to browse the new chat data. The user may perform operations such as clicking or touching on the second prompt information, thereby quickly displaying the newly received chat data in the chat information display region, and thus being convenient for the user to switch between the historical chat data and the new chat data.

In some optional implementations of the embodiment, the display interface displays a preset interaction information input component. The information display method further comprises: in response to a trigger operation performed on the interaction information input component by the user being detected, receiving interaction information inputted by the user and transmitting the interaction information.

An interaction information input component may be displayed on the display interface for displaying the multimedia data stream, so as to conveniently input chat data related to the content of the multimedia by the user on the display interface for displaying the multimedia data stream. The interaction information input component may be embedded in the display interface, or may be arranged above the display interface in a form of a floating window.

The interaction information input component may include a chat information input component. When the user performs a trigger operation on the chat information input component, the user may input chat information via a chat information input device (for example a keyboard) in communication connection with the terminal device.

In some application scenarios, when the user performs the trigger operation on the chat information input component, a virtual keyboard for inputting chat information may be displayed on the display interface. The user may input the chat information via the virtual keyboard.

In the application scenarios, the user can quickly input chat data related to the multimedia conference via the chat information input component.

In some application scenarios, the interaction information input component comprises an emoji information input component. The process of receiving interaction information inputted by the user in response to a trigger operation performed on the interaction information input component by the user being detected comprises: displaying a predetermined number of shortcut emoji in a shortcut emoji display region in response to a first trigger operation performed on the emoji information input component by the user being detected; and determining target emoji inputted by the user according to a selection operation performed on the shortcut emoji display region by the user. The shortcut emoji is an emoji whose counted frequency of use by the user is greater than a preset frequency threshold. The preset frequency threshold may be any integer equal to or greater than one. The preset frequency threshold may be set according to specific application scenarios, and is not limited herein.

In the application scenarios, the user can find his common emoji in the shortcut emoji display region, and selects the target emoji from the common emoji, thereby increasing a speed for inputting the emoji data by the user.

In some optional implementation of the embodiment, the predetermined number of shortcut emoji include candidate emoji of which a use frequency is greater than the preset frequency threshold, where the use frequency is determined according to historical use record of multiple emoji by the user in a third party application which is acquired under authorization.

In the optional implementation, the candidate emoji to be displayed in the shortcut emoji display region is determined according to the use record of the emoji by the user in the third party application. The candidate emoji determined in the above manner matches with use habit of the user more.

In some optional implementations of the embodiment, the process of receiving chat data inputted by the user in response to a trigger operation performed on the interaction information input component by the user being detected comprises: displaying a detailed emoji list on the display interface in response to an operation for acquiring the detailed emoji performed by the user being detected; and determining target emoji inputted by the user from multiple emoji according to a selection operation performed on the detailed emoji list by the user.

In the optional implementation, a component for acquiring detailed emoji may be displayed on the display interface. For example, the component for acquiring detailed emoji is arranged in the shortcut emoji display region.

When the user selects the component for acquiring detailed emoji, a detailed emoji list may be displayed on the display interface. The detailed emoji list may include multiple emoji. The emoji listed in the detailed emoji list may include the shortcut emoji displayed in the shortcut emoji display region.

When the user does not find appropriate emoji in the shortcut emoji display region, the user may search the detailed emoji list.

In some optional implementations of the embodiment, the information display method further comprises: hiding the chat information display region on the display interface if a hiding operation for hiding the chat information display region performed by the user is received.

The preset hiding operation may be an operation for setting a display parameter of the chat information display region to be hiding.

In some optional implementations of the embodiment, a hiding component for hiding the chat information display region is arranged on the display interface. The process of hiding the chat information display region on the display interface if the preset hiding operation for hiding the chat information display region performed by the user is received includes: hiding the chat information display region, in response to a trigger operation performed on the hiding component by the user being detected.

In practice, a component for displaying or hiding the chat information display region may be arranged on the display interface. When the user triggers the display component, the display parameter of the chat information display region may be set to be displaying. When the user triggers the hiding component, the display parameter of the chat information display region may be set to be hiding.

With the display component and the hiding component, the display attribute of the chat information display region can be set quickly.

In some optional implementation of the embodiment, when the chat information display region is hidden on the display interface, an emoji component for sending emoji data is displayed on the display interface. The information display method further comprises: displaying a detailed emoji chat data display region and/or a shortcut emoji display region, in response to a trigger operation performed on the emoji component by the user being received when the chat information display region is hidden; and determining and transmitting target emoji selected by the user according to a selection operation performed on the detailed emoji chat data display region or the shortcut emoji display region by the user.

In a case that the chat information display region is hidden, the user may input emoji data via the emoji component and transmit the emoji data.

Figure 2A:
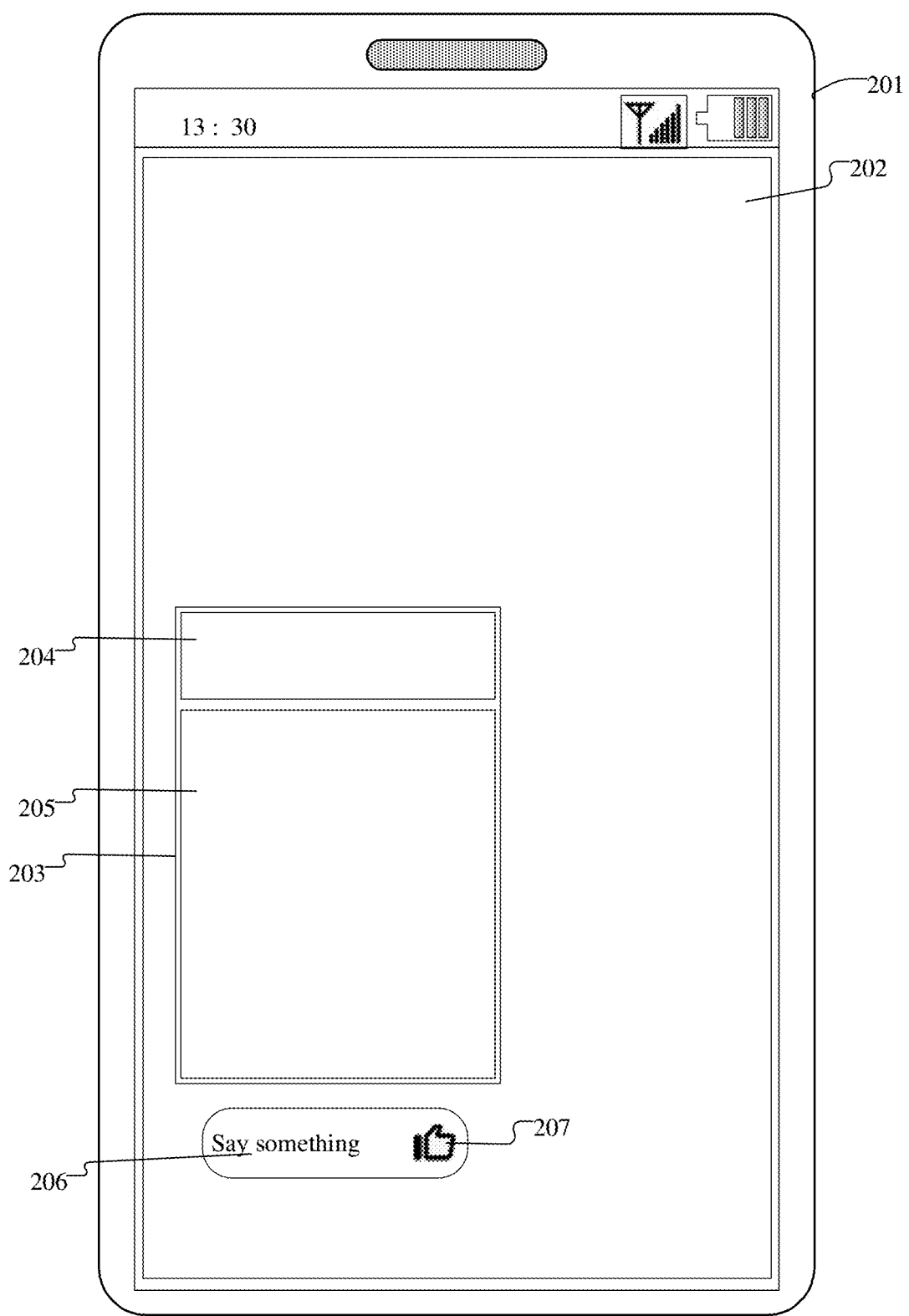
FIG. 2A to FIG. 2C show schematic diagrams of an application scenario of the information display method according to an embodiment of the present disclosure.
Figure 2B:
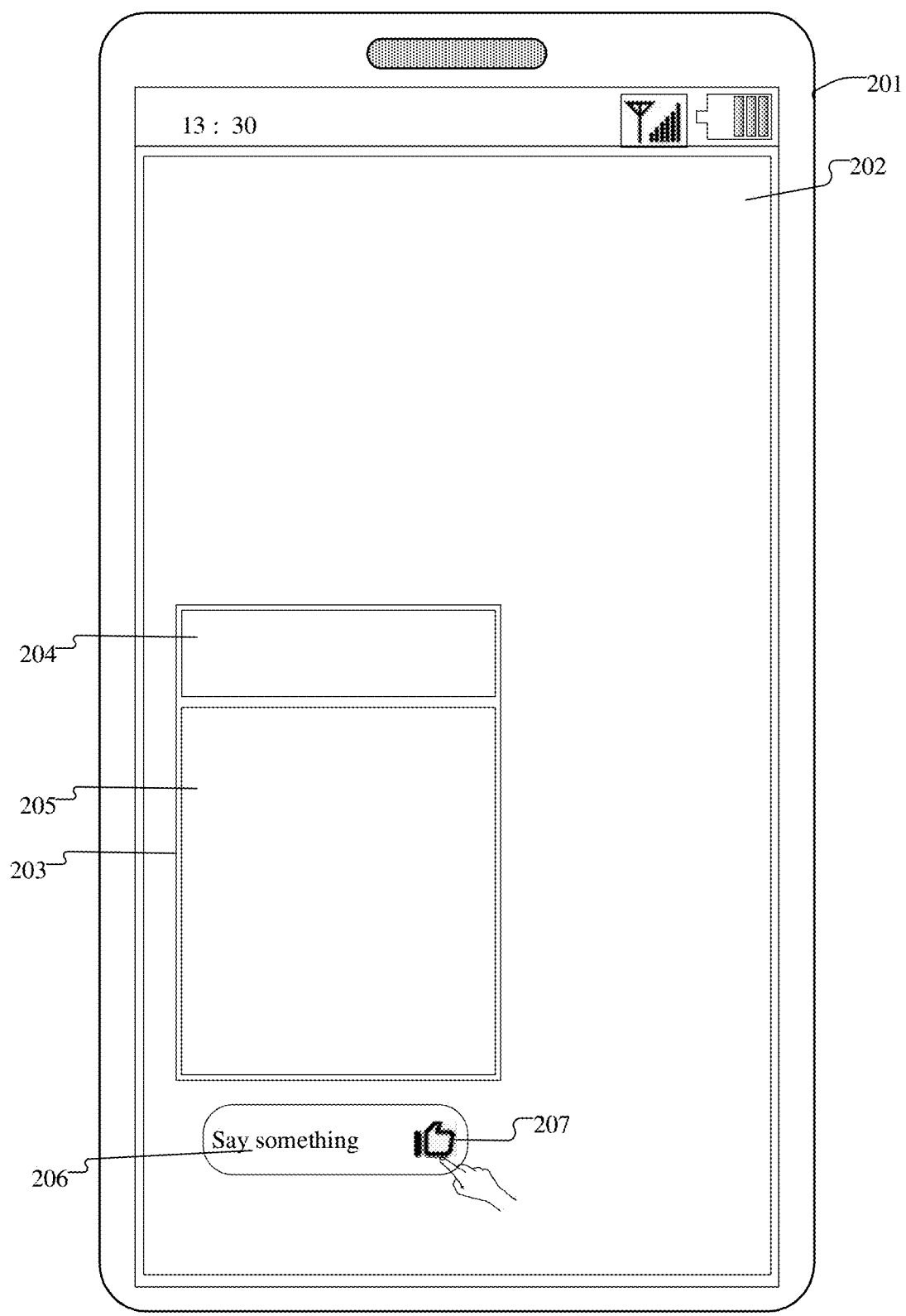
Figure 2C:
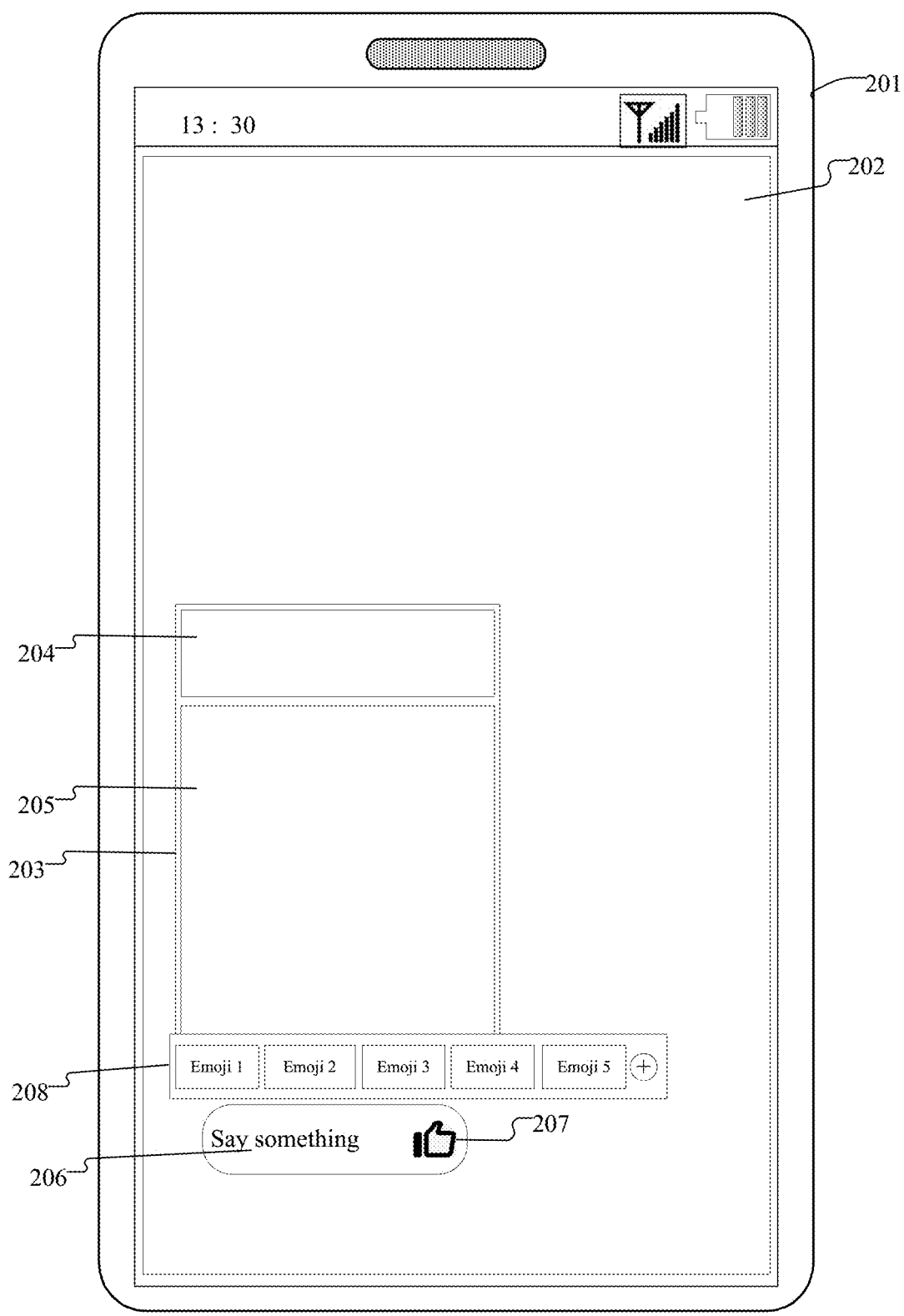

Reference is made to FIG. 2A to FIG. 2C, which show schematic diagrams of an application scenario of the information display method according to the present disclosure.

FIG. 2A to FIG. 2C shows an example of a multimedia conference. A terminal device 201 of a user A1 participating in the conference may receive an information stream of the multimedia conference sent by a server of the multimedia conference. The information stream may include multimedia data streams of multiple users participating the conference and interaction information inputted by the users according to the multimedia conference. The interference information may include a chat data type and an emoji data type. The multimedia conference herein may be a video conference. The multimedia data stream includes a video data stream. The terminal device of the user A1 may display the data stream of the multimedia video on a display interface 202 for displaying the multimedia conference, and displays the interaction information between the users in an interaction information display region 203. Chat data and emoji data may be displayed at different positions in the interaction information display region 203. The interaction information display region 203 may include an emoji information display region 204 and a chat information display region 205. The emoji data and the chat data may be displayed respectively in the emoji information display region 204 and the chat information display region 205.

An interaction information input component may be arranged on the display interface 202. The interaction information input component may include a chat information input component 206 and an emoji information input component 207. The chat information input component 206 may display prompt information indicating the chat information input component, for example "Say something . . . ". The emoji information input component 207 may display prompt information indicating the emoji information input component, for example a like icon shown in FIG. 2A. As shown in FIG. 2B, the user A1 may perform operations such as clicking and touching on the emoji information input component 207. When the user A1 performs a selection operation on the emoji information input component 207, a shortcut emoji display region 208 may be displayed on the display interface for displaying the multimedia data stream, as shown in FIG. 2C. A predetermined number of shortcut emoji may be displayed in the shortcut emoji display region 208. The shortcut emoji may be an emoji whose counted frequency of use by the user A1 is greater than a preset frequency threshold. The shortcut emoji may include emoji 1, emoji 2, emoji 3, emoji 4 and emoji 5. The emoji 1, the emoji 2, the emoji 3, the emoji 4 and the emoji 5 may be any emoji. The user A1 may select target emoji in the shortcut emoji display region 208. For example, the user A1 selects the emoji 1 as the target emoji. The terminal device of the user A1 may take the currently collected audio data stream, video data stream and the target emoji of the user A1 as a current information stream of the user A1 to transmit the current information stream to the server of the multimedia conference.

Figure 3:
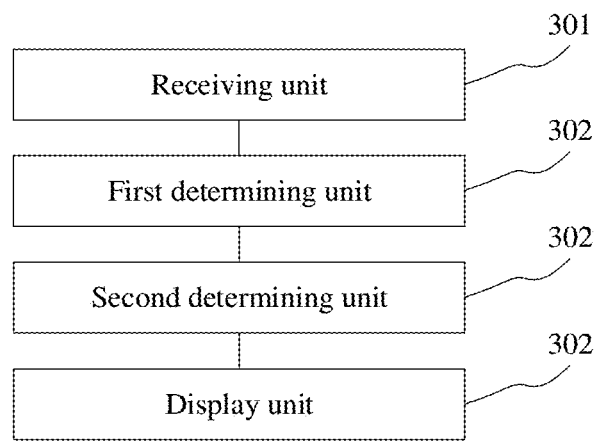
FIG. 3 is a schematic structural diagram of an information display apparatus according to an embodiment of the present disclosure.

Reference is made to FIG. 3 which shows an information display apparatus according to an embodiment of the present disclosure. The apparatus is applied to implement the method shown in FIG. 1. The apparatus embodiment corresponds to the method embodiment shown in FIG. 1. The apparatus may be applied to various electronic devices.

As shown in FIG. 3, the information display apparatus comprises a receiving unit 301, a determining unit 302 and a display unit 303. The receiving unit 301 is configured to receive an information stream of a multimedia. The information stream includes a multimedia data stream and interaction information sent by a user according to content of the multimedia. The determining unit 302 is configured to determine a data type corresponding to chat data. The data type includes an emoji data type and a chat data type. The display unit 303 is configured to: in response to a determination that the interaction information is to be displayed currently on the display interface, display the interaction information in an interaction information display region corresponding to the data type on the display interface. The interaction information display region includes a chat information display region and an emoji information display region.

In the embodiment, for processing the receiving unit 301, the determining unit 302 and the display unit 303 in the information display apparatus and the resulting technical result, one may refer to related illustration in step 101, step 102 and step 103 in the embodiment corresponding to FIG. 1. Details are not provided herein.

In some optional implementations of the embodiment, the emoji information display region is independent from the chat information display region.

In some optional implementation of the embodiment, in the emoji information display region, a display duration of the emoji data is less than a first preset duration threshold.

In some optional implementations of the embodiment, the information display apparatus further comprises a generation unit (not shown). The generation unit is configured to generate a chat record according to chat data inputted in the chat information display region by the user.

In some optional implementations of the embodiment, the display unit 303 is further configured to display, in response to a determination that the chat information is not to be displayed currently on the display interface, first prompt information indicating new chat data is received on the display interface.

In some optional implementations of the embodiment, the display unit 304 is further configured to display a predetermined number of chat data in the preset chat information display region in an order opposite to an order for receiving the chat data by default.

In some optional implementation of the embodiment, the display unit 303 is further configured to: in response to an operation for viewing historical chat data performed on the chat information display region by the user being received, displaying corresponding historical chat data in the chat information display region.

In some optional implementations of the embodiment, the display unit 303 is further configured to: if new chat data is received while the user is viewing the historical chat data, display second prompt information indicating that the new chat data is received in the chat information display region.

In some optional implementations of the embodiment, the display unit 303 is further configured to display the new chat data in the chat information display region in response to a trigger operation performed on the second prompt information by the user.

In some optional implementations of the embodiment, the display interface displays a preset interaction information input component. The information display apparatus further comprises an information input unit (not shown). The information input unit is configured to: in response to a trigger operation performed on the interaction information input component performed by the user being detected, receiving interaction information inputted by the user and transmitting the interaction information.

In some optional implementations of the embodiment, the interaction information input component includes an emoji information input component. The information input unit is further configured to: display a predetermined number of shortcut emoji in a shortcut emoji display region in response to a first trigger operation performed on the emoji information input component by the user being detected, where the shortcut emoji is an emoji whose counted frequency of use by the user is greater than a preset frequency threshold; and determining target emoji inputted by the user according to a selection operation performed on the shortcut emoji display region by the user.

In some optional implementations of the embodiment, the predetermined number of shortcut emoji includes emoji whose frequency of use is greater than a preset frequency threshold, and the use frequency is determined according to historical use record of multiple emoji by the user in a third party application which is acquired under authorization.

In some optional implementations of the embodiment, the information input unit is further configured to: in response to an operation for acquiring detailed emoji performed by the user being detected, display a detailed emoji list on the display interface; and determine target emoji inputted by the user from the multiple emoji according to a selection operation performed on the detailed emoji list by the user.

In some optional implementations of the embodiment, the display unit 303 is configured to hide the chat information display region on the display interface, if a preset operation for hiding the chat information display region performed by the user is received.

In some optional implementations of the embodiment, a hiding component for hiding the chat information display region is arranged on the display interface. The display unit 303 is configured to hide the chat information display region on the display interface in response to a trigger operation performed on the hiding component performed by the user being detected.

In some optional implementations of the embodiment, when the chat information display region is hidden on the display interface, an emoji component for sending emoji data is displayed on the display interface. The display unit 303 is further configured to: in response to a trigger operation performed on the emoji component being received when the chat information display region is hidden, display a detailed emoji chat data display region and/or a shortcut emoji display region; and determining target emoji selected by the user and transmitting the target emoji, according to a selection operation performed on the detailed emoji chat data display region or the shortcut emoji display region by the user.

According to the information display apparatus provided in the embodiment, the receive unit receives the information stream of the multimedia. The information stream includes a multimedia data stream and interaction information sent by the user according to content of the multimedia. The determining unit determines the data type corresponding to the chat data. The data type includes an emoji data type and a chat data type. The display unit displays the interaction information in the interaction information display region corresponding to the data type on the display interface, in response to a determination that the interaction information is to be displayed currently on the display interface. The interaction information display region includes a chat information display region and an emoji information display region. In the prior art, the emoji information is displayed by inserting the emoji data among multiple pieces of chat information in the same information display region, according to an order for receiving the information. Therefore, with the method for displaying chat data according to the present disclosure, the user can obtain more chat data with a same type at a same time instant, thereby saving time for browsing the chat data by the user and thus improving user experience Reference is made to FIG. 4 which shows a structure of a schematic system to which the information display method or the information display apparatus may be applied according to an embodiment of the present disclosure.

Figure 4:
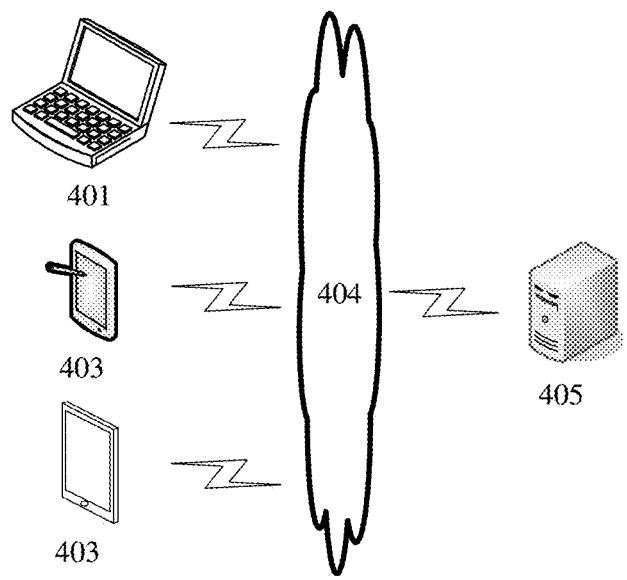
FIG. 4 is a structure of a schematic system to which the information display method may be applied according to an embodiment of the present disclosure.

As shown in FIG. 4, the system may include terminal devices 401, 402, 403, a network 404 and a server 405. The network 404 is configured to provide medium of a communication link between the terminal devices 401, 402, 403 and the server 405. The network 404 may include a wired network, a wireless communication link or an optical fiber cable.

The terminal devices 401, 402 and 403 may interact with the server 405 over the network 404, to receive or transmit messages. The terminal devices 401, 402 and 403 may be installed with various clients, such as web browser application, search application, news application and multimedia conference application. The client application in the terminal devices 401, 402 and 403 may receive an instruction from the user, and perform corresponding functions in response to the instruction of the user. For example, the terminal device adds corresponding information in response to the instruction of the user.

The terminal devices 401, 402 and 403 may be implemented by hardware or software. In a case that the terminal devices 401, 402 and 403 are implemented as hardware, the terminal device may be an electronic device including a display screen and supporting web browsing, including but not limited to a smart mobile phone, a tablet computer, an electronic book reader, a moving picture experts group audio layer III (MP3) player, a moving picture experts group audio layer IV (MP4) player, a laptop portable computer and a desktop computer. In a case that the terminal devices 401, 402 and 403 are implemented by software, the terminal device may be installed in the electronic device listed above. The terminal device may be implemented as multiple software or software modules (for example software or software module for providing a distributed service), or may be implemented as a single software or software module. The implementations of the terminal device are not limited herein.

The server 405 may provide various services. For example, the server 405 is configured to receive an information stream of a multimedia conference sent by the terminal devices 401, 402 and 403, analyze the information stream, and send the analyzed information stream to the terminal devices 401, 402 and 403.

It should be noted that, the information processing method described in the embodiments of the present disclosure may be performed the terminal device. Accordingly, the information processing apparatus may be arranged in the terminal devices 401, 402 and 403. Alternatively, the information display method provided in the embodiment of the present disclosure may be performed by the server 405. Accordingly, the information display apparatus may be arranged in the server 405.

It should be understood that the numbers of terminal device, network and server in FIG. 4 are only schematic. Any number of terminal device, network and server may be provided according to actual need.

Figure 5:
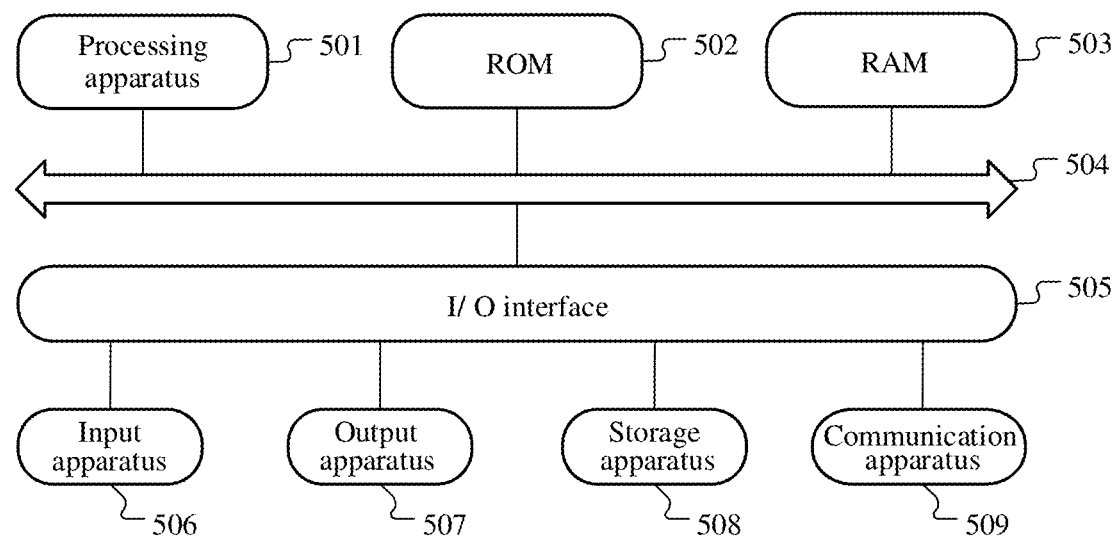
FIG. 5 is a schematic structural diagram of an electronic device for implementing embodiments of the present disclosure.

Reference is made to FIG. 5 which shows a schematic structural diagram of an electronic device for implementing the embodiments of the present disclosure (the terminal device or the server shown in FIG. 4). The terminal device according to the embodiment of the present disclosure may include but not limited to a mobile terminal such as a mobile phone, a notebook computer, a digital broadcast receiver, a personal digital assistance (PDA), a tablet computer (PAD), a portable multimedia player (PMP) and a vehicle terminal (for example a vehicle navigation terminal); and a fixed terminal such as digital TV and a desktop computer. The electronic device in FIG. 5 is schematic, and is not intended to limit the function and use scope of the embodiments of the present disclosure.

As shown in FIG. 5, the electronic device may include a processing apparatus (such as a central processor and a graphic processor) 501. The processing apparatus may perform various appropriate actions and processing by executing programs stored in a read-only memory (ROM) 502 or programs uploaded from a storage apparatus 508 to a random access memory (RAM) 503. Various programs and data required for operations of the electronic device are also stored in the RAM 503. The processing apparatus 501, the ROM 502 and the RAM 503 are connected to each other through the bus 504. An input/output (I/O) interface 505 is also connected to the bus 504.

Generally, the following components are connected to the I/O interface 505: an input apparatus 506 such as a touch screen, a touch panel, a keyboard, a mouse, a camera, a microphone, an accelerometer, and gyroscope; an output apparatus 507 such as a liquid crystal display (LCD), a loudspeaker and a vibrator; a storage apparatus 508 such as a magnetic tape, a hard disk and a storage card; and a communication apparatus 509. The communication apparatus 509 may allow the electronic device to communicate with other device in a wired or wireless manner to exchange data. Although FIG. 5 shows the electronic device provided with various apparatuses, it should be understood that not all shown apparatuses are necessary. Alternatively, more or less apparatuses may be included. Each block shown in FIG. 5 may represent one apparatus, or may represent multiple apparatuses according to need.

According to the embodiments of the present disclosure, a process described in the flowchart may be implemented by computer software programs. For example, according to an embodiment of the present disclosure, a computer program product including computer program carried on a computer readable medium is provided. The computer program includes program codes for performing the method shown in the flowchart. In such embodiment, the computer program may be downloaded and installed from the network through the communication apparatus 509, installed from the storage apparatus 508 or installed from the ROM 502. The computer program is executed by the processing apparatus 501 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable medium may be included in the electronic device described above, or may exist independently and is not installed in the electronic device. The computer readable storage medium carries one or more programs. The one or more programs, when being executed by the electronic device, cause the electronic device to perform operations: receiving an information stream of multimedia, where the information stream includes a multimedia data stream and interaction information sent by a user according to content of the multimedia; determining a data type corresponding to the interaction information, where the data type includes an emoji data type and a chat data type; in response to a determination that the interaction information is to be displayed on a display interface for displaying the multimedia data stream, displaying the interaction information in an interaction information display region corresponding to the data type on the display interface. The interaction information display region includes a chat information display region and an emoji information display region.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the units do not limit the units in a certain case. For example, the receiving unit may be described as "a unit for receiving an information stream of a multimedia conference".

The functions described above may be partially performed by one or more hardware logic components. For example, the hardware logic components include: a field programmable gate array (FPGA), an application specific integrated circuit (ASIC), an application specific standard product (ASSP), a system on chip (SOC), a complex programmable logic device (CPLD) and so on.

It the context of the present disclosure, the computer readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable storage medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

The invention claimed is:

1. An information display method, comprising:
    receiving an information stream of a multimedia, wherein the information stream comprises a multimedia data stream and interaction information sent by a user according to content of the multimedia;
    determining a data type corresponding to the interaction information, wherein the data type comprises an emoji data type and a chat data type; and
    displaying, in response to a determination that the interaction information is to be displayed on a display interface for displaying the multimedia data stream, the interaction information in an interaction information display region corresponding to the data type on the display interface, wherein the interaction information display region comprises a chat information display region and an emoji information display region.

2. The method according to claim 1, wherein the emoji information display region is independent from the chat information display region.

3. The method according to claim 1, wherein in the emoji information display region, a display duration of emoji data is less than a first preset duration threshold.

4. The method according to claim 1, further comprising:
    generating a chat record based on chat data inputted in the chat information display region by the user.

5. The method according to claim 1, further comprising:
    displaying, in response to a determination that the interaction information is not to be displayed on the display interface, first prompt information indicating that new interaction information is received on the display interface.

6. The method according to claim 1, wherein in the chat information display region, a predetermined number of chat data is displayed in an order opposite to an order for receiving the chat data by default.

7. The method according to claim 6, further comprising:
    displaying, in response to an operation instruction for viewing historical chat data in the chat information display region performed by the user being received, corresponding historical chat data in the chat information display region.

8. The method according to claim 7, further comprising:
    displaying, if new chat data is received while the user is viewing the historical chat data, second prompt information indicating that the new chat data is received in the chat information display region.

9. The method according to claim 8, further comprising:
    displaying, in response to a trigger operation performed on the second prompt information by the user, the new chat data in the chat information display region.

10. The method according to claim 1, wherein the display interfaces displays a preset interaction information input component;
    and wherein the method further comprises:
    receiving interaction information inputted by the user in response to a trigger operation performed on the interaction information input component by the user being detected; and
    transmitting the interaction information.

11. The method according to claim 10, wherein the interaction information input component comprises an emoji information input component;
    and wherein the receiving interaction information inputted by the user in response to a trigger operation performed on the interaction information input component by the user being detected comprises:
    displaying, in response to a first trigger operation performed on the emoji information input component by the user being detected, a predetermined number of shortcut emoji in a shortcut emoji display region, wherein the shortcut emoji is an emoji whose counted frequency of use by the user is greater than a preset frequency threshold; and
    determining target emoji inputted by the user according to a selection operation performed on the shortcut emoji display region by the user.

12. The method according to claim 11, wherein the predetermined number of shortcut emoji comprises shortcut emoji whose frequency of use is greater than a preset frequency threshold, and the use frequency is determined according to historical use record of a plurality of emoji by the user in a third party application which is acquired under authorization.

13. The method according to claim 11, wherein the receiving chat data inputted by the user in response to a trigger operation performed on the interaction information input component by the user being detected comprises:
    displaying, in response to an operation for acquiring detailed emoji performed by the user being detected, a detailed emoji list on the display interface; and
    determining target emoji inputted by the user from a plurality of emoji according to a selection operation performed on the detailed emoji list by the user.

14. The method according to claim 1, further comprising:
    hiding the chat information display region on the display interface in response to a preset operation for hiding the chat information display region performed by the user being received.

15. The method according to claim 14, wherein a hiding component for hiding the chat information display region is arranged on the display interface;
    and wherein the hiding the chat information display region on the display interface in response to a preset operation for hiding the chat information display region performed by the user being received comprises:
    hiding the chat information display region on the display interface in response to a trigger operation performed on the hiding component by the user being detected.

16. The method according to claim 14, wherein an emoji component for sending emoji data is displayed on the display interface after the chat information display region is hidden on the display interface;
    and wherein the method further comprises:
    displaying a detailed emoji data display region and/or a shortcut emoji display region in response to a trigger operation performed on the emoji component by the user being received after the chat information display region is hidden; and
    determining and transmitting the target emoji selected by the user, according to a selection operation performed on the detailed emoji data display region or the shortcut emoji display region by the user.

17. The method according to claim 2, wherein in the emoji information display region, a display duration of emoji data is less than a first preset duration threshold.

18. An information display apparatus, comprising:
one or more processors; and
a memory configured to store one or more programs;
wherein when the one or more programs are executed by the one or more processors, the one or more processors are caused to perform operations of:
receiving an information stream of a multimedia, wherein the information stream comprises a multimedia data stream and interaction information sent by a user according to content of the multimedia;
determining a data type corresponding to the interaction information, wherein the data type comprises an emoji data type and a chat data type; and
displaying, in response to a determination that the interaction information is to be displayed on a display interface for displaying the multimedia data stream, the interaction information in an interaction information display region corresponding to the data type on the display interface, wherein the interaction information display region comprises a chat information display region and an emoji information display region.

19. A computer readable medium storing computer programs, wherein the programs are executed by a processor to perform operations of:
receiving an information stream of a multimedia, wherein the information stream comprises a multimedia data stream and interaction information sent by a user according to content of the multimedia;
determining a data type corresponding to the interaction information, wherein the data type comprises an emoji data type and a chat data type; and
displaying, in response to a determination that the interaction information is to be displayed on a display interface for displaying the multimedia data stream, the interaction information in an interaction information display region corresponding to the data type on the display interface, wherein the interaction information display region comprises a chat information display region and an emoji information display region.

* * * * *